Nov. 4, 1958 W. EIRICH ET AL 2,858,594
MIXING PLANT

Filed July 9, 1956 7 Sheets-Sheet 1

INVENTOR
Wilhelm Eirich
Gustav Eirich

BY Bailey, Stephens & Huettig
ATTORNEYS

Nov. 4, 1958

W. EIRICH ET AL 2,858,594

MIXING PLANT

Filed July 9, 1956

INVENTORS
Wilhelm Eirich
Gustav Eirich

By Bailey Stephens & Huettig
ATTORNEYS

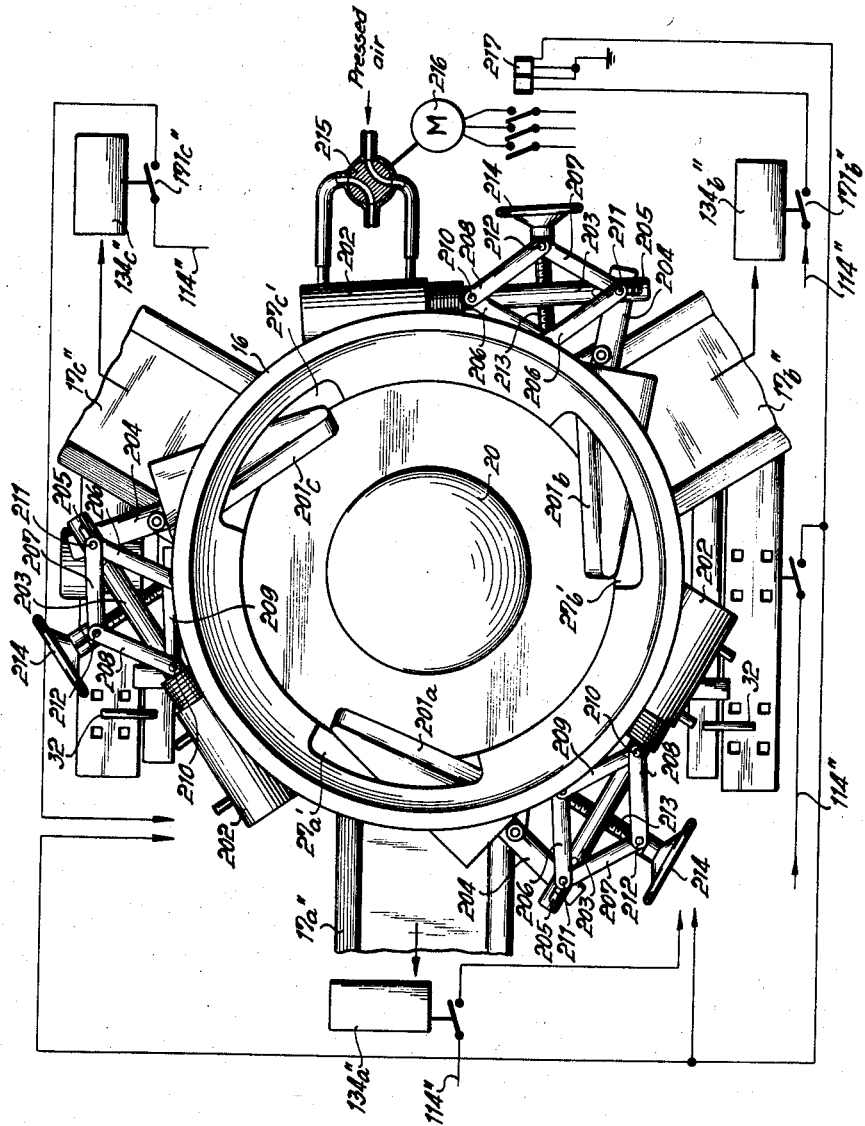

Nov. 4, 1958

W. EIRICH ET AL 2,858,594

MIXING PLANT

Filed July 9, 1956

INVENTOR

Wilhelm Eirich
Gustav Eirich

By Bailey Stephens & Huettig
ATTORNEYS

Nov. 4, 1958

W. EIRICH ET AL 2,858,594

MIXING PLANT

Filed July 9, 1956

INVENTOR
Wilhelm Eirich
Gustav Eirich

By Bailey Stephens v Huettig
ATTORNEYS

Nov. 4, 1958  W. EIRICH ET AL  2,858,594
MIXING PLANT
Filed July 9, 1956  7 Sheets-Sheet 7
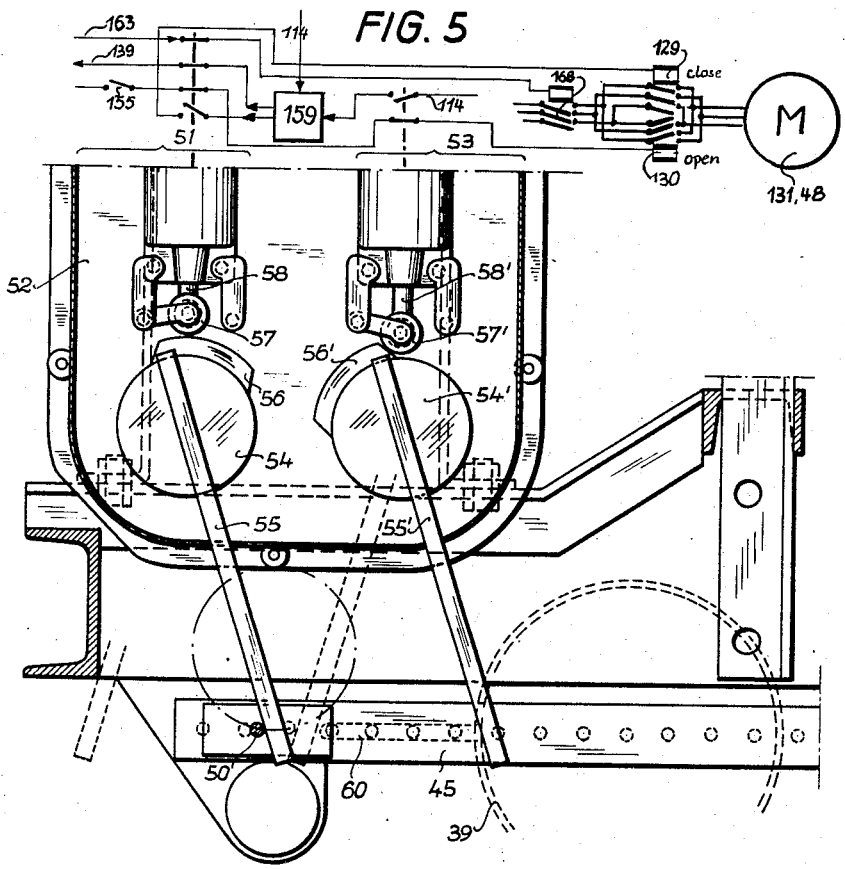
INVENTOR
Wilhelm Eirich
Gostav Eirich
By Bailey Stephens & Huettig
ATTORNEYS

United States Patent Office 2,858,594
Patented Nov. 4, 1958

2,858,594

MIXING PLANT

Wilhelm Eirich and Gustav Eirich, Hardheim, Nordbaden, Germany

Application July 9, 1956, Serial No. 596,661

Claims priority, application Germany July 9, 1955

11 Claims. (Cl. 25—2)

The invention relates to plants having a mixer furnishing material to consuming mechanism, and more particularly to the automatic control of such plants.

It is known that intermittently operating mixers produce substantially better, particularly more uniform, mixtures than can be achieved by means of continuously operating mixers. It is also known to control intermittent mixers automatically in all phases of their operation. In the known apparatus of that kind, the shutting off of the discharge means after the discharge of the mixer, triggers the filling of the mixer with the new starting materials in predetermined quantities and order. For controlling the quantities of the material supplied to the mixer, automatic balances are preferably employed. The supply of material to the mixer can, for example, be effected by an automatically controlled elevator.

In these automatically controlled mixers, it is also possible to adjust the mixing time of the mixing apparatus. When the time has elapsed, a signal is given for the discharge, or the discharge is effected automatically. Now, the difficulty is to connect such discontinuous mixers with continuous consuming plants such as concrete molding plants or extrusion presses. The mere inclusion of an intermediate bin is not sufficient, because in any consuming plant tieups may occur which would soon cause the bin to overflow.

The primary object of the invention is to overcome the disadvantages of the prior plants of this type.

Another object of the invention is to provide, in such a plant, an intermediate bin between the mixer and the consuming plant, which stores the material fed from the mixer, and supplies it to the consuming plant in a predetermined manner. The intermediate bin is provided with at least one means for measuring its degree of filling which is connected to means for shutting off the supply of material to the intermediate bin; and it is, if so desired, connected to means for shutting off the discharge means of the bin, and for stopping the consuming plant.

A further object of the invention is to provide, in such a plant, an arrangement by which, even in the case of a change of schedule in the consuming plant, the mixer need not be shut off.

Still another object of the invention is to make it possible to control the consuming plant in such a manner that it consumes considerably smaller quantities of material than would correspond to the greatest efficiency of the mixer, as in such a case the intermediate bin is constantly being filled up to a certain degree, but cannot overflow. On the other hand, it is also possible to operate the consuming plant temporarily with quantities of material larger than can be supplied by the mixer. In this case, the supply of material to the consuming plant is stopped, or said plant is itself stopped, when the intermediate bin is discharged below a certain point. In this way, there will always be a certain reserve of material in the bin, so that in case of failure of the mixer or in the supply of starting material, the consuming plant can continue to operate.

Still a further object of the invention is to provide means to interrupt the periodic opening and closing of the discharge of the mixes, while the supply of material to the mixes is controlled in known manner by its discharge means. Thus, the interruption of the periodic opening and closing of the discharge means indirectly interrupts the supply of material to the mixer. This arrangement is particularly suitable where the operation of the mixer when empty would be harmful, whereas a prolongation of the mixing time does not reduce the quality of the mixture (for example, hot mixtures).

It is also an object of the invention to provide means responsive to the shutting off of the supply of material which act directly on the circuit for the regulation of the supply to the mixer. This arrangement is advantageous where it is of no consequence whether the mixer runs empty, whereas a prolongation of the mixing period would reduce the quality of the mixture.

An additional object of the invention is to provide the intermediate bin with a discharge means which supplies the required material to the plant at intervals, and which is controlled relative to time or by means of an automatic scale. In the latter arrangement, the discharge means can be so controlled that the discharged quantities are considerably smaller than the quantity of material supplied to the bin. Consequently, the discharge intervals are, then, considerably shorter than those of the mixer, as, according to experience, it is often advantageous to mix the materials in rather large quantities, particularly when a relatively long period of mixing is needed because of the progress of a chemical reaction or because of fluctuations in quality of the raw material which can be evened out through longer mixing. On the other hand, the consumption of such large quantities takes more time, so that the discharge intervals have to be shorter.

A further object of the invention is to provide the discharge means of the intermediate bin with a control means which, depending on the quantity of material in the bin, opens the discharge means in varying degree so that the mixed material remains in the bin for an adjustable, substantially unchanged, period of time. This is advantageous when, in a multi-stage chemical process, the material has to be prepared in one stage, which can include a mixing and granulating operation, and is supplied to the bin in which a subsequent stage of the process takes place.

It is another object of the invention to provide, for the switches of the various cycles controlled by the control means of the intermediate bin, double locking means, which guarantees the efficient operation of a pulley automatic plant. Such locking means permit the plant to be put in operation at the beginning of a new shift, and to be shut off at the end of a shift without supervision during the intervening period.

It is a further object of the invention to provide means for automatically stopping the plant when an irregularity occurs in the operation of any of the mechanisms thereof.

Further objects and advantages of the invention will appear more fully from the following description, especially when taken in conjunction with the accompanying drawings which form a part thereof.

In the drawings:

Fig. 3a is a similar view of a bin for supplying several such mechanisms; and

Figs. 4 and 5 show details of the discharge control mechanism.

Figure 1:
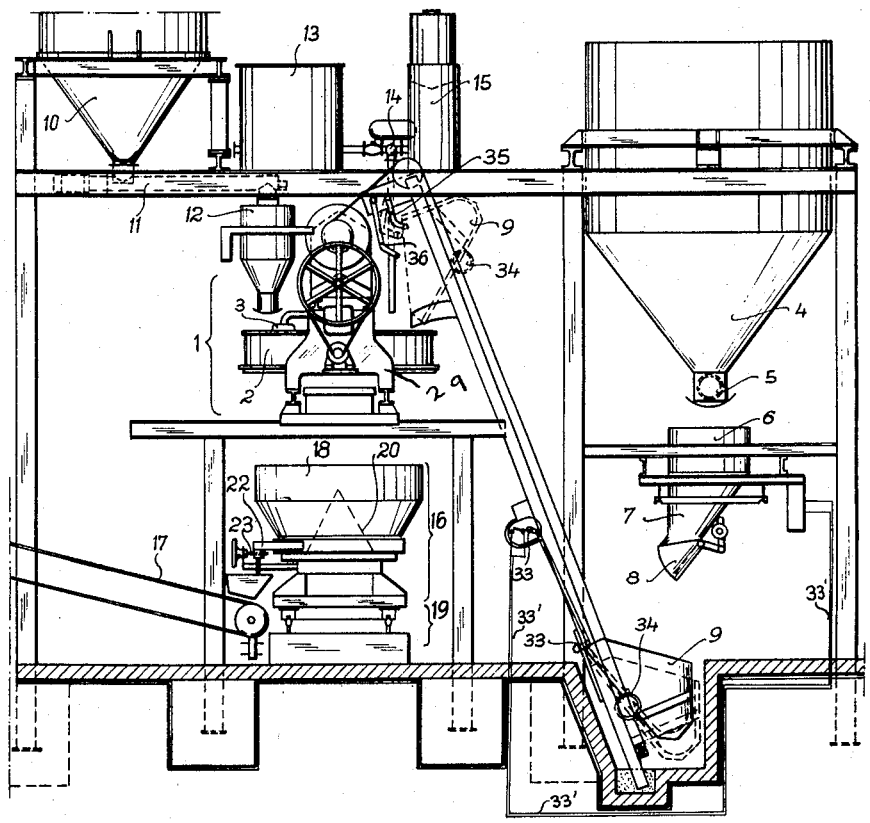
Fig. 1 shows in side elevation a machine embodying the invention.

The invention is shown as applied to a concrete molding plant.

In the automatic concrete mixing plant, counter-current mixer 1 has a rotating mixing vessel 2 and mixing blades or knives 3. The raw material is supplied to the mixer from various hoppers. From a number of hoppers 4 gravel and sand are conveyed by screw conveyors 5 which weigh out the components of the mixture in accordance with predetermined mixing ratios. From containers 6, the components are fed to hoppers 7 provided with gates 8, and thence to elevators 9 which carry the material to mixing container 2. Cement is stored in hopper 10 whence it is supplied by screw conveyor 11 to container 12 of an automatic scale; container 12 is also shaped to form a hopper which delivers the material directly to container 2. Water is supplied from tank 13 by a three-way faucet 14 to a piston plunger water meter 15 and thence, in the other direction, through faucet 14 to mixer 2.

Underneath mixer 1, a circular feeder 16 of known type, is arranged, which received the mixture from mixer 1 and continuously supplied it to conveyor belt 17. The upper portion of feeder 16 forms an intermediate bin 18, carried by an automatic scale 19.

Figure 2:
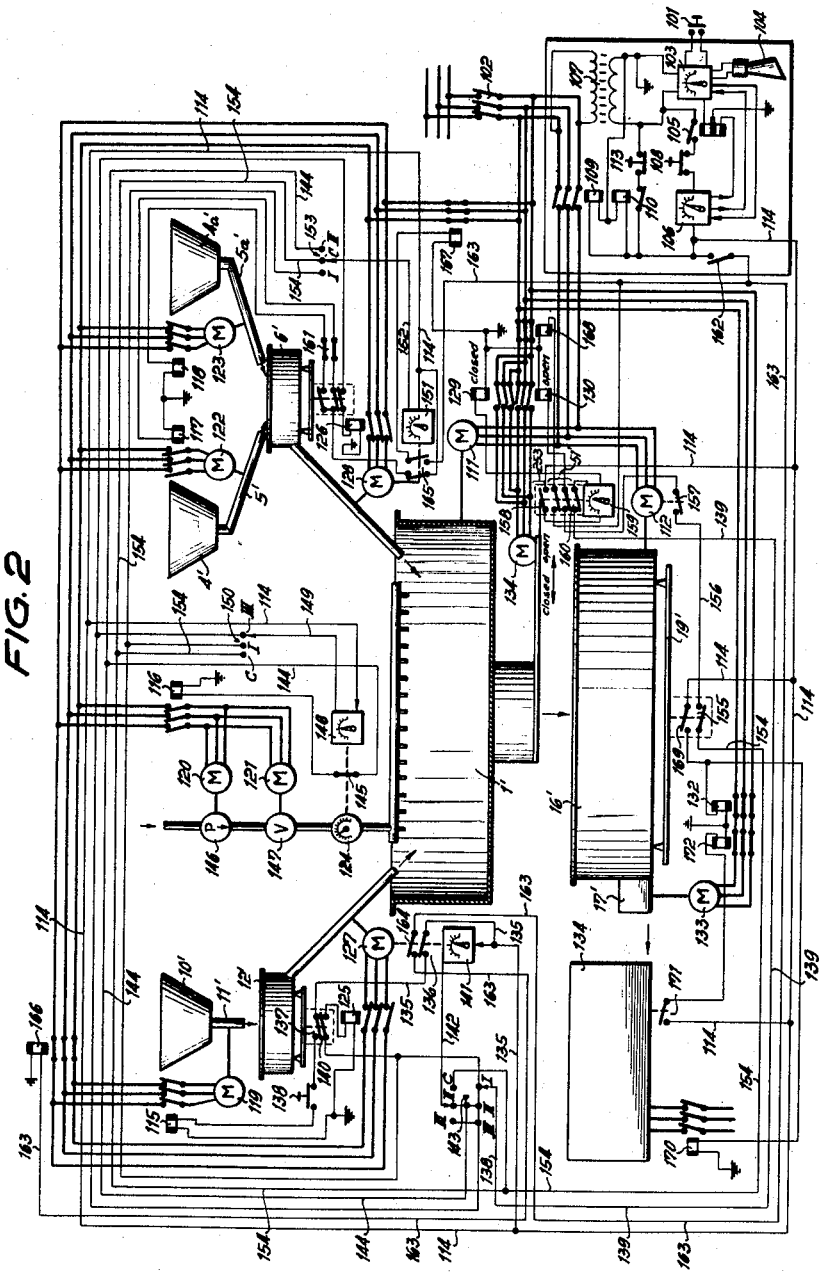
Fig. 2 is a wiring diagram of a modified form of machine.

The plant as shown in the drawings is, according to the invention, controlled as shown in Fig. 2, it being noted that for simplification the plant of Fig. 2 is somewhat modified with respect to that of Fig. 1 in that it does not have an elevator, and that the water meter 15 is of conventional structure.

The construction and operation of such a plant will now be explained, with reference to Fig. 2.

In order to start a plant as shown in Fig. 2, the main high-voltage switch 102 and, then, switch 101 are switched on. Switch 101 starts time relay 103 which, in turn, actuates a signal 104, for example, a horn. Signal 104 is cut off after the period set on relay 103 has expired. Relay 103 also actuates relay 105 to close its switch and time relay 106. As long as relay 106 is on (the total time can be two or even three minutes) the control voltage supplied by transformer 107 is, consequently, connected to the terminals of main switch 108. If, during the period relay 106 is on, switch 108 is switched on, the latter energizes relays 109 and 110. The switch of relay 109 connects the main line current directly to motor 11 of mixer 1' and motor 112 of intermediate bin 16'; and, on the other hand, the switch of relay 110 connects, through disconnecting switch 113 which is normally closed, the control voltage transformer 107 to the main control circuit 114. After the expiration of the time set on relay 106, it deenergizes relay 105 to open the control circuit. If in the meantime main switch 108 has not been closed, the plant can only be started by actuating primary switch 101 again; in other words, the plant can only be started after the expiration of a new warning period.

By the closing of switch 102 in the power line, the power is directly connected to the switches controlled by relays 115, 116, 117 and 118, these switches controlling motors 119, 120, 121, 122 and 123 for the supply of material to automatic scales 12' and 6', and power is also supplied to water meter 124. The starting of these motors also requires the supply of the control voltage through the main control line 114, to actuate, directly or indirectly, the switch closing relays.

By closing of switch 102 the main current is also supplied to switches controlled by relays 125 and 126 which control motors 127 and 128 for effecting the discharge of material from automatic scales 6' and 12' into mixer 1' and it is also supplied to switches controlled by relays 129 and 130 which control motor 131 operating the discharge gate of the mixer; and to a switch controlled by relay 132 which controls motor 133 which operates the discharge gate 17' of the intermediate bin. However, the automatic control does not close the relays prior to the performance of the successive operational steps.

In operational step I, in which, for example, one of the components for the mixture to be prepared is supplied from hopper 10' through automatic scale 12' to mixer 1', control line 135 is branched off of main control line 114. Control line 135 supplies current to relay 115 across switch 136 actuated by motor 127 of the automatic scale 12', across contact 137 directly actuated by scale 12', and across normally closed manual switch 138. Since switch 136 is closed when the discharge gate of scale 12' is closed, and contact 137 is closed when scale 12' is empty, material is supplied by motor 119 from hopper 10' to scale 12' until the weight set on the scale is reached so that switch 137 will open. The scale is now in condition to deliver the material to mixer 1'. In order to effect such delivery, motor 127 is started by control line 139 which is connected to an arrangement 159 for determining the mixing time across contacts 138 of switch 51'. Since this switch is closed only after a predetermined mixing period by arrangement 159, current actuating relay 125 is only supplied with current through line 139 across switch 140 controlled by automatic scale 12' (this switch being closed when the scale 12' is full) upon expiration of the mixing period and closure of the discharge gate of the mixer, and, moreover, upon the proper refilling of scale 12'. Upon discharge of scale 12', motor 127 closes the discharge gate thereof and then closes switch 136. Since the scale rises upon discharge of material therefrom, contact 137 is closed again, so that scale 12' is then refilled by motor 119.

When the discharge gate of scale 12' closes, motor 127 starts the timing period of relay 141, on which a period of time can be set, during which the material supplied from scale 12' to mixer 1' is treated therein separately. Thereafter relay 141 supplies a control impulse to line 142 which (in the embodiment shown in the drawing) is connected at terminal board 143 to the second operational step or stage. In the embodiment shown, this stage comprises a means for the supply of a liquid such as water or the like, to the mixer. From terminal panel 143 the control voltage originating from relay 141 is supplied by line 144 and switch 145 actuated by liquid meter 124 to relay 116. Motors 120 and 121 start pump 146 and valve 147, respectively. The liquid is supplied to mixer 1' under pressure and in a quantity set at meter 124. When such predetermined quantity has passed through meter 124, the latter opens switch 145 and starts the timing period of relay 148 which is supplied with current from line 114. On relay 148 a period of time can also be set in which the material from hopper 10' is mixed with the liquid. After the expiration of such time, relay 148 gives a control impulse on line 149 which is connected at terminal panel 150 to the third operational stage. This actuates the relay controlling switch 126 to close the circuit to motor 128 and start the discharge of bin 6'. This third stage is substantially similar to the first stage, the only difference being that scale 6' of such third stage is a multi-component scale and that material is supplied thereto from two hoppers 4' and 4a' respectively. After the material in automatic scale 6' is discharged into mixer 1', similarly to the discharge operation of scale 12', motor 128 actuates time relay 151 to which current is supplied from main control line 114. The mixing time for all the ingredients is set on relay 151 and after the expiration of such time relay 151 gives an impulse to line 152 which is connected at terminal board 153 to line 154.

The sequence of the operational steps can be changed at will by changing the connections on the respective terminal boards 143, 150 and 153 as desired. Moreover, the respective time of the premixing, intermediate and main mixing operations can also be adjusted at will. The time relay of the stage first put in operation controls the premixing time, the relay of the second stage controls the intermediate mixing time and that in the last stage controls the final mixing time.

It is also possible to substitute an automatic scale in place of water supply means shown in Fig. 2. In that case, an arrangement similar to hopper 10' and its controls, but using a tank instead of a hopper, would be used. Furthermore, it is possible to employ a piston plunger water meter as shown in Fig. 1 instead of the water supply means shown in Fig. 2.

From the last time relay (in the arrangement shown in Fig. 2 this is relay 151) the control current flows through line 154 to contact 155 of the automatic scale which supports the intermediate bin 16'. Normally contact 155 is closed, but it is automatically opened as soon as the weight of the material in bin 16' exceeds the upper limit set on the scale. From contact 155 the control current is connected through line 156 to switch 157 operated by the motor of bin 16'. Switch 157 is always closed when motor 112 is operating and prevents the supply of mixed material to bin 16' unless the latter being driven. If contact 155 of scale 19' and switch 157 are closed, the control current flows to relay 130 and causes operation of motor 131 in such a direction that the discharge gate of mixer 1' is opened. When such gate is completely opened, switch 53 (see Fig. 5) is actuated which cuts off motor 131 (not shown in Fig. 2 for reasons of simplification) and across contact 158, starts the timing period of relay 159 on which the time needed for the discharge of the mixer is set. After the expiration of such time, relay 159 gives an impulse to relay 129 so that motor 131 starts in the opposite direction so as to close the gate. At the same time relay 159 supplies a control current to control line 139 across the contact of switch 51' (see Fig. 5) which is closed when the gate is closed, and thus starts again the discharge of the automatic scale (121) of the operational stage I.

In order to stop the entire plant and prepare it for a subsequent start immediately, the supply of the starting materials can be stopped either by switching off switches 138 and 161 in the control lines of relays 115, 117 and 118, respectively, or by closing switch 162. By closing switch 162, the control voltage is supplied to an additional control line 163. This additional control line is connected to relays 166, 167 and 168 across switches 164 and 165 actuated by motors 127 and 128, respectively, and across a contact in switch 51 (see Fig. 5) of the gate. When switch 162 is closed, each stage is automatically cut off after termination of the respective operations. If switch 162 is closed while the main mixing operation is in progress, any further supply of material to the mixer is cut off in that relay 168 responds and cuts off all the motors which supply the material. After the discharge from the mixer, its discharge gate is switched off, too. The motors of the mixer and the intermediate bin and the discharge therefrom are not affected by this switching operation.

Besides contact 155, scale 19' is also provided with a contact 169 which responds to a minimum weight of material in bin 16'. Then, closing of this switch connects relay 132 to line 114 so that motor 133 is cut off. Likewise, consuming plant 134 can be cut off by inserting relay 170 in its power supply line, the coil of relay 170 being connected in parallel with that of relay 132. On the other hand, the supply of mixed material to consuming device 134 can be cut off by a switch 171 operated either by hand or automatically, such switch connecting line 114 to relay 172 in the supply circuit of motor 133 of gate 17'.

In the embodiment of the invention shown in Fig. 2 automatic scale 19' by means of its contact 155 actuates the gate of mixer 1', but it is also possible in accordance with the invention to regulate the supply of material to mixer 1' by means of scale 19'. This is particularly required when the material in mixer 1' is not permitted to remain therein for more than a predetermined period. In that case a switch corresponding to switch 155 is inserted in line 139.

Figure 2A:
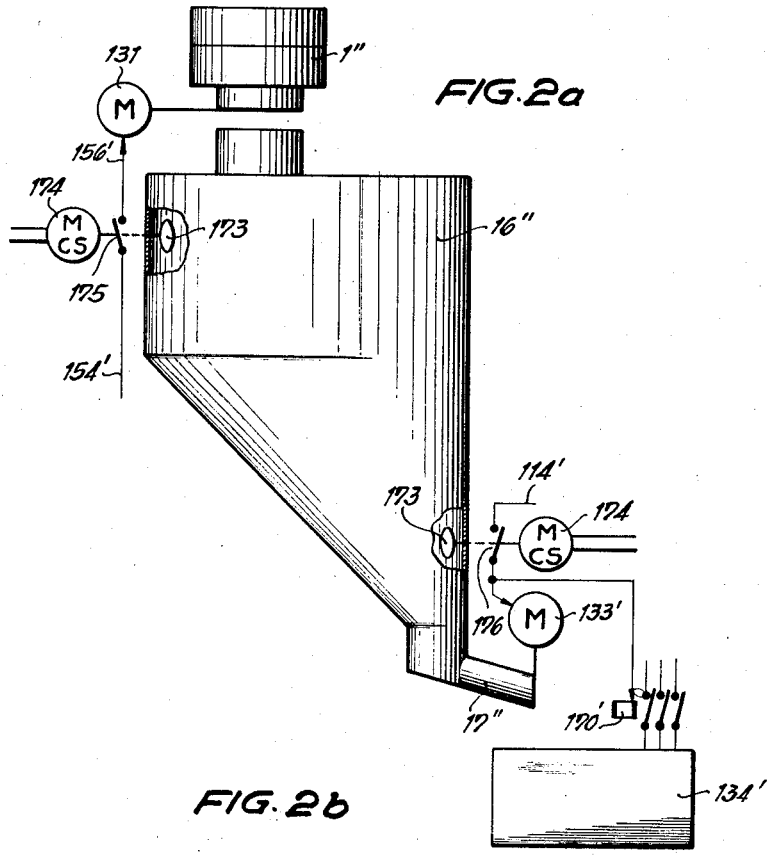
Fig. 2a shows diagrammatically a different form of measuring device for the bin.

Intermediate bin 16' can be provided with volumetric or temperature meters instead of scale 19'. A type of volumetric meter that can be employed is disclosed in United States Patent No. 2,633,509. But such meters may also (Fig. 2a) consist of rotating discs or scoop wheels 173 driven by motors 174. Torque switches 175 and 176 connected to the respective driving shafts of the discs or scoop wheels 173 are substituted for contacts 155 and 169 of scale 19', respectively.

If temperature control of the mixed material is desired, one or both the rotating discs or scoop wheels 173 and motors 174 as well as the torque switches 175 and 176 respectively, are changed by contact thermometers as they are well known and commercially obtainable.

For time relays of such as 103, 106, 141, 148, 151, 159 of Figure 2 may be used by the invention such relays as they are known and commercially obtainable as engineering components containing a desired number of switches, a mechanically or electrically driven clock work or time piece constructed for setting its running time on the said clock work or time piece and a means for actuating the said clock work or time piece by an electrical or mechanical impulse. The said clock work or time piece is arranged in a manner to close and open, respectively, the said switches after the set running time.

If the discharge from, or the supply of material to bin 16' is regulated with respect to temperatures of the material in bin 16', conventional contact thermometers or the like are employed instead of volumetric meters 173 to 176.

Figure 2B:
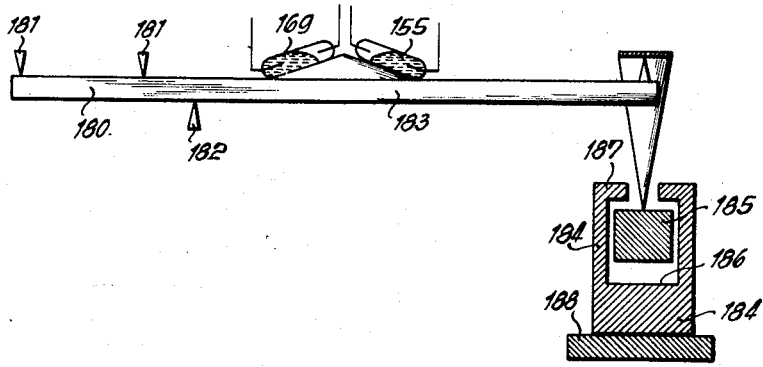
Fig. 2b shows a detail of the scale arrangement for the bin.

In order to describe more clearly the operation of automatic scales 6', 12' and 19', a scale beam is diagrammatically shown in Fig. 2b. The scale beam is that of a conventional platform scale and fulcrums 180 and 181 are set on its short lever arm, fulcrums 180 and 181 being linked by rods to the scale frame which supports the bin. The beam proper is fulcrumed on fulcrum 182, and the weight is fulcrumed at the end of its weighing arm 183. This weight consists of a plurality of elements. For example, it consists of an outer weight member 184 containing an inner weight member 185 supported so as to be movable therein in a vertical direction. Mercury switches 155 and 169 are arranged on the beam in slanting position. When the weight of material in bin 16' drops below the lower weight limit, inner weight 185 pulls arm 183 downward until weight 185 comes to a stop on the bottom of the cavity in 184 so that switch 169 is closed. Upon refilling bin 16', weight 185 is lifted up from the bottom of 184, and it moves upward until it hits portion 187 of the outer weight 184. In this movement switch 169 opens. Upon further increase of weight, the beam maintains its position until it lifts both of weights 184 and 185 so that the outer weight is lifted up from its base 188. This closes switch 155, which opens again, when the weight of material in bin 16' has decreased to such an extent that arm 183 lowers weight 184 and lets it rest on base 188. Upon further decrease of weight of the material in bin 16', weight 185 will pull arm 183 further downward.

Instead of a weight consisting of two parts, one that consists of a plurality of parts can be employed. This is of importance in case a multi-component scale such as scale 6' is employed.

Figure 3:
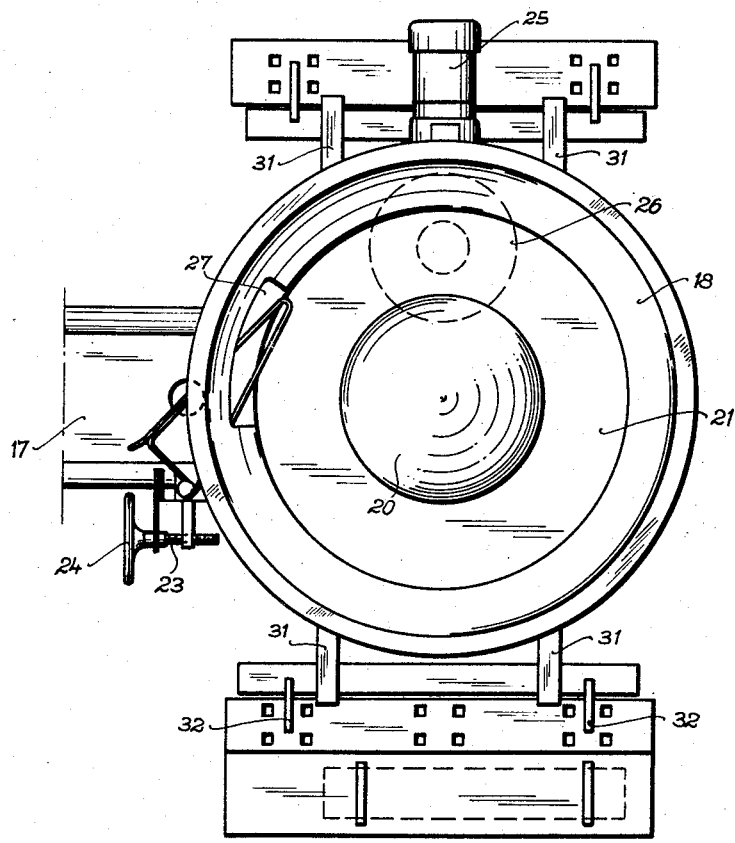
Fig. 3 shows in top plan view a bin for supplying a single consuming mechanism.

Details of mechanical structure of the circular conveyor 16 with the intermediate bin 18 and automatic scale 19 are shown in Figs. 1 and 3. Cone 20 is arranged inside conveyor 16. An annular disk 21 rotates about cone 20. A discharging knife 22 extends into the path of disk 21. The position of knife 22 is adjusted by means of spindle 23 and hand wheel 24. Disk 21 is driven by motor 25 through a stepless, adjustable reduction gear 26. A belt conveyor 17 extends to discharge opening 27. The space above conveyor 16 has the form of an intermediate bin 18. The capacity of bin 18 corresponds to that of three mixing charges.

It is also possible to design a conveyor for the supply of material to a plurality of consuming stations. Such a conveyor is shown in Fig. 3a.

In this modification the circular conveyor is provided with three discharge gates or openings 27a', 27b' and 27c'. Extending therethrough into the path of material in the bin are discharge tongues 201a, 201b and 201c. These tongues are provided with adjusting and actuating means controlled by consuming stations or plants 134a", 134b" and 134c". The adjusting and actuating means consists of a compressed air or hydraulic cylinder 202 whose piston rod 203 is connected to actuating lever 204 at tongue 201. This connection is provided by a longitudinal slot 205 at the end of rod 203, and by four levers 206 to 209 arranged in the form of a toggle. This arrangement is swingably but not movably connected to the piston rod at 210, and swingably and movably connected thereto at 211. Levers 206 to 209 are supported by a spindle 213 at 212, the spindle being provided with a hand wheel 214. By means of wheel 214 and levers 206–209, the effective length of rod 203 can be adjusted. The longer the effective length of rod 203, the more will tongue 201 protrude into the conveyor so that the more material will be discharged.

The actuating means operates independently of the above adjusting means in that the piston in cylinder 202 pushes rod 203 together with the entire adjusting means away from cylinder 202 or pulls it towards the cylinder. In the latter position, tongue 201 closes opening 27'. The piston is actuated by means of two-way valves 215 actuated by electro-magnets or motors 216.

The electric control is effected as follows: Main control line 114", corresponding to line 114 of Fig. 2, is connected to relay 217 across contact 169" of the automatic scale of the intermediate bin, which responds to a minimum charge in the bin; and, in parallel thereto, across switches 171a", 171b" or 171c" of the consuming stations or plants 134a", 134b" or 134c", respectively. When the charge in the circular conveyor drops below a predetermined minimum, switch 169" actuates all the valves 215 and closes all the openings 27a', 27b' and 27c'. If any of the consuming plants 134a", b", c" is no longer in a condition to receive material, switches 171a", b", c" close the respective discharge openings.

Conveyor 16 and intermediate bin 18 are accommodated on automatic scale 19. The platform of the scale supporting the conveyor and the bin consists of a frame 29 comprising double T-beams. Frame 29 is mounted on scale arms 30 and 31 which transmit the force of the weight to the scale proper by arms 32. Various types of electric scales can be employed provided they meet certain requirements. One requirement is the possibility of adjustably setting the weight limits. Moreover, means indicating that the scale is empty must be provided in order to prevent residues of material from remaining in the intermediate bin upon the shutting off of the entire plant. Finally, the scale has to be provided with some means for indicating the degree of filling, and it must also be provided with some means for preventing the scale from being over filled, such as a switch which actuates the control means of the plant when the upper weight limit is exceeded.

In general, the same type of scale can be employed in connection with the hoppers which hold the raw material. Again such scales will have to be provided with some means for indicating the complete discharge, partial filling and over filling, such as a switch of the type described above. When the scale connected to the delivery of one component material is not completely discharged, the scale will stop all other electric scales and delivery means through the device for indicating whether the scale is completely discharged or not. The same will occur when the means for indicating the partial filling is actuated, for instance when no material is supplied from a hopper, because it is empty. Again, when the pan of a scale is overfilled because of a failure of the discharge gate of a hopper, the member controlled by the scale will respond and will stop the supply of the remaining component materials.

Preferably the electric scale, in addition to the above safety devices, is also provided with a switch adapting the scale to control the proportions of the mixture. Such switch may be automatic or operated by hand. The presence of such a switch necessitates a safety device which prevents the actuation of the switch when the weighing operation is in progress. Another suitable means which may be used with the scale is a counter or recording mechanism which indicates the number of mixture charges of any given formula. Such a counter can also be employed in such a manner that a predetermined number of charges are weighed, whereupon the plant is partially or entirely shut off automatically.

The trouble-free operation of the plant requires that the switches of all the stages of the plant be protected by double locking means. As shown in Fig. 1, the track or rails of the elevator bin or bucket 9 are provided with a lower end position switch 33 attached to one rail. Switch 33 is actuated by bucket 9, when it engages the switch on its downward travel. If switch 33 is overrun but not actuated because of some fault, switch 34 which responds to the limpness of the cable will be actuated. Switches 33 and 34 also serve as double locking means for gate 8 of hopper 7, preventing the supply of material to the elevator when bucket 9 is not in its lower position. The upper end position switches 35 and 36 also are designed as a double locking means. Switch 36 will be actuated if the bucket overruns switch 35.

Figure 4:
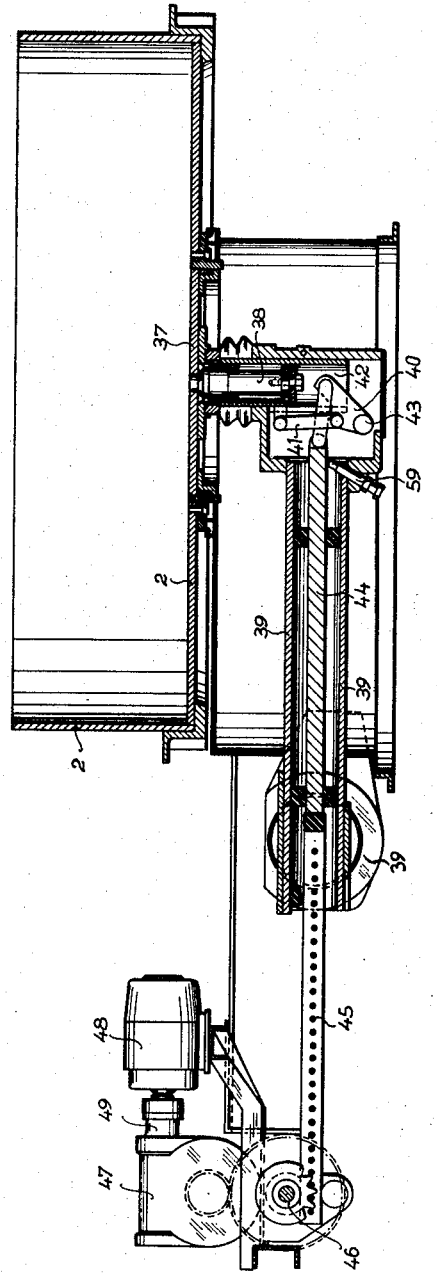

Figs. 4 and 5 illustrate the double locking means for the discharge gate of mixer 1. A closing device such as is disclosed in U. S. Patent No. 1,737,301 is used. The device is operated by a gear rack 45. A gear wheel 46 connected by gear 47 to motor 48 meshes with rack 45. Motor 48 and gear 47 are connected by a tongue switch 49 which responds to both directions of rotation of the motor. Between motor 48 and gear 47 a circular slip clutch is arranged which upon actuation of the tongue switch when the closing device engages its end position stop, prevents mechanical damage to the parts of the closing device. At the free end of rack 45 a pin 50 is mounted which actuates switch 51 when the closing device is closed. Switch 51 is located in a casing 52 above rack 45. The same casing 52 also contains the end switch 53 for the open-position of the closing device. Switches 51 and 53 are of identical structure. Each comprises a rotatable cam 54 to which a lever 55 is linked. Cam 56 of cam wheel 54 actuates lifter 58 through roller 57.

In order to limit the sliding movement of frame 39, pin 60 mounted on the front edge of the carriage contacts lever 55' of switch 53 and moves it ahead. Thus cam 54' is rotated and opens the relay of motor 48. In case of failure of switch 53, frame 39 moves until it engages the supporting elements of mixer 1 so that the torque of motor 48 is considerably increased. This increase will actuate torque switch 49 which actuates the relay of motor 48 and a signaling device indicating a fault has occurred in the plant. The torque switch can be set so as to shut off the entire plant or part thereof.

In closing the gate, the above operations occur in the reverse order. In the last phase of movement of the closing of disk 37, pin 50 on rack 45 engages lever 55 of switch 51 actuating it similarly to actuation of switch 53 by pin 60. Upon failure of switch 51, rack 45 is forced further into carriage 39 so that levers 40, 41 and 42 engage the walls of the casing. This, in turn, increases the torque of the motor immediately so that switch 49 is actuated.

While we have described herein some embodiments of our invention, we wish it to be understood that we do not intend to limit ourselves thereby except within the scope of the claims hereto or hereinafter appended.

We claim:

1. In a plant comprising a mixer, an intermediate bin and consuming mechanism, means to discharge material from the mixer to the bin, means to transfer material from the bin to the consuming mechanism, means responsive to the filling of the bin to prevent operation of said discharge means of the mixer thereto, and means responsive to the emptying of the bin to render said consuming mechanism inoperative.

2. In a plant as claimed in claim 1, means to feed material to said mixer, and means responsive to the amount of material in the bin to control the operation of said feeding means.

3. In a plant as claimed in claim 1, means to feed measured quantities of material to the mixer, means to regulate the mixing time of the mixer, and means responsive to the volume of material in the bin to initiate operation of said feeding and regulating means.

4. In a plant as claimed in claim 3, means responsive to the volume of material in the bin to control said transfer means.

5. In a plant as claimed in claim 3, said volume responsive means comprising a scale on which said bin is mounted.

6. In a plant as claimed in claim 3, said volume responsive means including a rotating paddle wheel within the mixer, and means responsive to the torque required to turn such wheel.

7. In a plant as claimed in claim 1, means responsive to the volume of material in the bin to control said transfer means.

8. In a plant as claimed in claim 1, means to regulate the time of holding material within the bin, and means responsive to the temperature of the material in the bin to adjust said last means.

9. In a plant as claimed in claim 1, said bin responsive means including double locking switch means.

10. In a plant comprising a mixer, an intermediate bin and consuming mechanism, means to discharge material from the mixer to the bin, means to transfer material from the bin to the consuming mechanism, means responsive to the filling of the bin to prevent operation of said discharge of the mixer thereto, means to feed measured quantities of materials to the mixer, means to regulate the mixing time of the mixer, and means responsive to the volume of material in the bin to initiate operation of said feeding and regulating means.

11. In a plant as claimed in claim 10, means responsive to the volume of material in the bin to control said transfer means.

References Cited in the file of this patent

UNITED STATES PATENTS

| | | |
|---|---|---|
| 2,109,534 | Johnson | Mar. 1, 1938 |
| 2,232,404 | Pratt | Feb. 18, 1941 |
| 2,519,391 | McMillan et al. | Aug. 22, 1950 |
| 2,656,142 | Weckerly | Oct. 20, 1953 |
| 2,727,733 | Carswell | Dec. 20, 1955 |